2,830,010

POWDER-FILLED HEXYLRESORCINOL CAPSULES

William Valentine, Nanuet, and Carl Louis Stearns, Blauvelt, N. Y., assignors to American Cyanamid Company, New York, N. Y., a corporation of Maine No Drawing. Application May 14, 1956
Serial No. 584,456

10 Claims. (Cl. 167—83)

This invention relates to a new dosage unit form of hexylresorcinol and to a process of preparing the same.

Hexylresorcinol, 4-hexyl-1,3-dihydroxybenzene, is a heavy liquid which becomes solid upon standing at room temperature. It is considered an effective agent as an anthelmintic, particularly in the treatment of helminths which inhabit the intestinal tract of humans and animals. It has been used against hookworms, pinworms, whipworms and various other helminths. Unfortunately, however, it is very corrosive and is especially irritating to the mucous membranes when given orally. It must, therefore, be coated with some protective agent which will prevent contact between the hexylresorcinol and the mouth and throat of the patient.

A number of ways have been suggested to provide suitable forms by which hexylresorcinol may be ingested. Enclosing the hexylresorcinol in a soft gelatin capsule is probably one of the most desirable ways of accomplishing this purpose. It has been found, however, that when hexylresorcinol is encased in a gelatin capsule, discoloration of the capsule and partial destruction of the gelatin coating soon follow so that such capsules have a useful life only a month or so. In addition, the physical nature of hexylresorcinol is such that it is difficult to place in capsules; and its corrosive nature makes it actually dangerous to handle in the operation.

Efforts to prepare a satisfactory dosage unit form of hexylresorcinol have included such expedients as preparing coated pellets of the material in an effort to prevent contact of the hexylresorcinol and the gelatin. Another was to coat the inner lining of the gelatin capsule with a material which would act as a barrier between the two. Obviously, these expedients are not satisfactory as they increase the difficulty of the capsule making operation and the cost of the finished product.

We have discovered that satisfactory dosage unit forms of hexylresorcinol can be prepared by absorbing hexylresorcinol in a silica aerogel and encapsulating the resulting powder. This mixture remains free-flowing, can be accurately measured and enclosed in a gelatin capsule with very little difficulty. These gelatin capsules are stable and will remain non-sticky and intact for a long period of time.

The silica aerogels that may be used in practicing the present invention are relatively new but generally available products. They are extremely porous, very light and relatively inert materials which have a physical structure which has been described as a tenuous web of microscopic silica filaments. They have bulk density ranging from about 3 to 15 pounds per cubic foot and a surface area of the order of from 100 to 250 sq. meters per gram. Particle sizes may range from about 0.5 to 5 microns. These products are sold under various trade names such as Santosel (Monsanto Chemical Company), Quso (Philadelphia Quartz), Cabosil (Godfrey L. Cabot), D. C. Silica (Dow-Corning), Micro-Cel (Johns-Manville) and a number of others. The latter product, Micro-Cel, is a synthetic calcium silicate whereas the others are mostly silicon dioxides.

Various ways of mixing the hexylresorcinol with the silica aerogel are possible. One of the simplest, but not necessarily the best, is to simply mix the hexylresorcinol and silica aerogel with the aid of heat to melt the hexylresorcinol. A more involved but more practical procedure is to prepare a solution of the hexylresorcinol in a suitable solvent and mix the silica aerogel therewith to obtain a free-flowing powder. A wide variety of solvents may be used in this process. Polyethylene glycols and polypropylene glycols are particularly well suited. Various oils such as olive oil, corn oil, cottonseed oil, castor oil and the like may also be used as solvents in the process. Another distinct manner of preparing the mixture prior to encapsulation is to dissolve the hexylresorcinol in a volatile solvent such as alcohol, chloroform, carbontetrachloride, acetone, benzene or the like, and after mixing with the silica aerogel, the solvent is allowed to evaporate, under the influence of some heating if desired.

The powders prepared as generally described above may be encapsulated on capsule making machinery capable of putting powders in gelatin capsules. An excellent machine for this process is described in U. S. Patent No. 2,663,128, Method and Machine for Making Capsules, issued December 22, 1953, to Stirn et al.

The silica aerogels are highly absorbent substances and absorb a considerable amount of liquid before the powder loses its free-flowing characteristics. In the case of hexylresorcinol, the maximum desirable proportion by weight of this material would be approximately equal that of the silica aerogel. Obviously, much larger proportions of the silica aerogel can be used but owing to the bulky nature of this material, the amount necessary to provide a therapeutic dose of the drug becomes excessively large and encapsulation problems are encountered. A final mix containing approximately 5 parts by weight of hexylresorcinol and 95% of the silica aerogel would represent a minimum desirable proportion of hexylresorcinol and a maximum of the silica aerogel.

The amount of the hexylresorcinol powder to be included in one dosage unit may vary considerably. Ordinarily, the gelatin capsule should contain from about 150 milligrams to 250 milligrams of hexylresorcinol. For the treatment of small animals, however, the amount of hexylresorcinol in a single dosage unit may be as low as about 10 milligrams and for the treatment of large animals as much as 1000 milligrams or more of the hexylresorcinol may be incorporated in a single gelatin capsule.

In order that the invention may be illustrated with greater particularity, a number of examples of particular formulations which have been prepared will be given.

Example 1

100 parts by weight of polyethylene glycol having an average molecular weight of about 400 was mixed with 200 parts by weight of hexylresorcinol and the mixture heated at 50° C. with stirring until a clear solution was obtained. To this was then added 100 parts by weight of Microcel (calcium silicate—Johns Manville) with constant agitation. Mixing was continued until a smooth homogeneous powder was obtained. This was then screened through a 16 mesh screen. The powder may be encapsulated as such or preferably in inert diluent such as starch or dicalcium phosphate and 1 to 2% of a lubricant such as magnesium stearate may be mixed with the hexylresorcinol powder in order to bring the volume of the powder so that with the particular capsule size that is to be formed, there may be an even dosage unit of hexylresorcinol in the finished capsules.

Capsules so prepared remain in a satisfactory condition for many months and remain clear in color, free-flowing and non-sticky whereas gelatin capsules filled with hexylresorcinol become wholly unsatisfactory in a very short time.

*Example 2*

4.4 parts by weight of polyethylene glycol having an average molecular weight of about 200 was mixed with 86.8 parts by weight of hexylresorcinol and the mixture heated to melt the hexylresorcinol into the polyethylene glycol. There was then added 8.8 parts by weight of silica aerogel (Siloid-Davidson). A free-flowing powder was obtained which could be readily formed into capsules on a powder filling capsule machine such as previously mentioned. The capsules remain stable, non-corrosive and dry over a long period of time.

*Example 3*

25 parts by weight of hexylresorcinol was suspended in an oil base consisting primarily of corn oil and 25 parts of a silica aerogel (Santosel, Grade C, Monsanto) was then added and the material was mixed to obtain a free-flowing powder. The powder was then mixed with an approximately equal weight of a diluent, dicalcium phosphate, and the material was filled into soft gelatin capsules. On exposure for 13 weeks at a temperature of 42° C., there was no apparent change in the physical appearance of the capsules.

*Example 4*

200 parts by weight of hexylresorcinol was dissolved in 200 parts by weight of ethyl alcohol, after which 100 grams of Micro-Cel was added and the composition was mixed until a smooth dry powder was obtained. This was placed on trays in a dry room and the alcohol allowed to evaporate. It was then put through a 40 mesh screen, mixed with a diluent and encapsulated.

What we claim is:

1. A dosage unit form of hexylresorcinol comprising a gelatin capsule filled with hexylresorcinol and a silica aerogel.

2. A dosage unit form of hexylresorcinol comprising a gelatin capsule filled with a powdered mixture of a silica aerogel and from about 5% to 50% by weight of hexylresorcinol.

3. A dosage unit form of hexylresorcinol comprising a gelatin capsule filled with a powdered mixture of a calcium silicate aerogel and hexylresorcinol, the amount of the hexylresorcinol being from about 5% to an equal part by weight of the calcium silicate.

4. A dosage unit form of hexylresorcinol comprising a gelatin capsule containing a powdered mixture of hexylresorcinol and a silica aerogel, the amount of said hexylresorcinol being from about 10 to 1000 milligrams.

5. A method of preparing a dosage unit form of hexylresorcinol which comprises the steps of mixing together hexylresorcinol and a silica aerogel to obtain a free-flowing powder and thereafter incorporating said powder in a gelatin capsule.

6. A method in accordance with claim 5 in which the hexylresorcinol and the silica aerogel are mixed with heating.

7. A method of preparing a dosage unit form of hexylresorcinol which comprises the steps of preparing a solution of hexylresorcinol in a volatile solvent, mixing therewith a silica aerogel, evaporating some of the solvent from said mixture, and thereafter enclosing said powdered mixture in a gelatin capsule.

8. A method of preparing a dosage unit form of hexylresorcinol which comprises the steps of dissolving hexylresorcinol in a solvent, mixing said solution with a silica aerogel and thereafter enclosing the resulting powder in a gelatin capsule.

9. The process in accordance with claim 8 in which the solvent is a polyalkylene glycol.

10. The process in accordance with claim 8 in which the silica aerogel is a calcium silicate.

References Cited in the file of this patent
UNITED STATES PATENTS

| | | |
|---|---|---|
| 2,059,811 | Sauer | Nov. 3, 1936 |
| 2,155,444 | Pittenger et al. | Apr. 25, 1939 |
| 2,665,996 | Kalousek | Jan. 12, 1954 |

OTHER REFERENCES

Drug and Cosmetic Industry, vol. 69, No. 3, September 1951, pages 317 and 378.